Nov. 6, 1962   F. REUSSER   3,062,724
METHOD FOR PREVENTING CULTURE DEGENERATION
IN A CONTINUOUS FERMENTATION
Filed Aug. 31, 1960   3 Sheets-Sheet 1

INVENTOR.
F. REUSSER
BY
Eugen A. Retter
ATTORNEY

Nov. 6, 1962 F. REUSSER 3,062,724
METHOD FOR PREVENTING CULTURE DEGENERATION
IN A CONTINUOUS FERMENTATION
Filed Aug. 31, 1960 3 Sheets-Sheet 2 fig. 4 fig. 6

INVENTOR.
F. REUSSER
BY
Eugene O. Retter
ATTORNEY

United States Patent Office 3,062,724
Patented Nov. 6, 1962

3,062,724
METHOD FOR PREVENTING CULTURE DEGEN-
ERATION IN A CONTINUOUS FERMENTATION
Fritz Reusser, Portage Township, Kalamazoo County,
Mich., assignor to The Upjohn Company, Kalamazoo,
Mich., a corporation of Delaware
Filed Aug. 31, 1960, Ser. No. 53,234
10 Claims. (Cl. 195—141)

This invention relates to a process for the continuous propagation of microorganisms.

Considerable attention has been directed, particularly in the past decade, to methods of achieving continuous fermentation. Such methods have important applications not only in the production of yeast and the associated brewing industries but, more recently, in the production of antibiotics by fermentation.

The advantages of carrying out a fermentation process on a continuous basis rather than in a batch process are well-recognized in the art. Thus, in a batch process considerable time is lost in cleaning and sterilizing equipment between batches. Further, in many cases, there is a time lag between the initial propagation of a microorganism and the point at which the productive cycle in the life of the microorganism is reached, which reduces the overall production potential of the batch process. Such time losses are considerably reduced in a continuous process and, using apparatus of the same capacity, it is possible in a given time to achieve a much greater throughput with a continuous process as opposed to a batch type process.

In addition, it is found that the risk of loss by contamination of the fermentation liquor is greatly reduced in the continuous process. The processing of the fermentation liquor can also be carried out on a continuous basis rather than a batch type of operation, thus effecting further economies in the use of equipment and manpower.

However, the methods hitherto described for the so-called continuous fermentation of microorganisms do not, in many instances, enable such processes to be maintained for more than a limited period of time. Thus, it is found, in many cases, that, under the conditions of continuous fermentation, the useful activity (e.g., the biosynthetic activity such as the ability to produce an antibiotic) gradually deteriorates. This is particularly true in the propagation of filamentous-type growth microorganisms. This type of microorganisms is discussed in greater detail below and is generally characterized by the growth of long, interwoven threads which type of growth makes the resulting fermentation liquor difficult to agitate and aerate.

A number of reasons have been advanced to account for the falling off of useful activity, the so-called strain degeneration in continuous fermentation processes. Such reasons include (a) biological changes during the fermentation, particularly changes in the strain-specific characteristics of the microbial population in the fermentor caused by factors such as genetical segregation and/or the production of mutants having different characteristics, and (b) accumulation of toxic compounds in the fermentation liquor during the fermentation.

The present invention is primarily concerned with a process in which the degeneration of a continuous fermentation, due to changes in the characteristics of the microbial population, can be obviated.

Thus, the present invention, in its broadest aspect, consists in a method for preventing degeneration of the strain-specific characteristics of a population of microorganisms in a fermentation process wherein said strain-specific characteristics are being utilized, which comprises culturing said population of microorganisms in a plurality of stages, continuously adding nutrient medium to the first stage and continuously withdrawing culture medium into the next stage at a rate to maintain the propagation of said microorganisms in a steady state, and periodically replacing the culture in the first stage with a fresh culture of said microorganisms.

The term "strain-specific characteristics of a population of microorganisms" means the biosynthetic property specific to that population, for example, the ability to produce a particular antibiotic, or the ability to produce an organic material such as citric acid, lower alkanols and the like.

In any population of microorganisms which is allowed to propagate freely, there will be present at any given time microorganisms in various stages of growth and, as the fermentation progresses, the proportion of the microorganisms which have passed through many stages of growth will increase.

Where the microorganism is one which is capable of producing elaboration products such as antibiotics and the like, the early stages of growth are devoted to cell formation. The production of the elaboration product generally lags behind the cell formation stage and only takes place at a later growth stage. The present invention is concerned with the propagation of organisms which exhibit this type of behavior. Eventually the ability of the microorganism to produce the elaboration product degenerates, i.e., the strain-specific characteristics of the population change, and strain degeneration occurs.

Two types of continuous fermentation have been described hitherto. In the first type the propagation of the organism is conducted in a conventional type tank fermentor and addition of fresh nutrient medium is made constantly to the fermentation liquor. At the same time fermentation liquor is removed from the fermentor so that the volume of liquid in the fermentor remains constant. All stages of growth will be present in the fermentor at any given time and since the composition of the fermentation liquor is substantially homogeneous the constant withdrawal of same will not disturb the overall composition of the population of microorganisms in the fermentor. When the microorganisms are subject to degeneration, degeneration occurs since no means is provided for separating the various stages of the fermentation.

In the second type of continuous fermentation hitherto described a multi-stage operation is carried out. The fermentation is conducted in a series of fermentors and fermentation liquor is passed from each fermentor to the next fermentor in the series. The withdrawal of fermentation liquor from the first vessel in the series is compensated by the addition thereto of fresh nutrient medium. When the microorganism employed is one subject to degeneration, degeneration occurs in each of the vessels in turn.

The process of the present invention is a multi-stage fermentation process but is clearly distinguished from the multi-stage processes hitherto described. In the process of the invention the cell growth stage of the microorganisms is largely confined to the first stage of the process and the productive growth stage of the microorganisms, i.e., the phase of growth in which the desired elaboration product is produced, is largely restricted to subsequent stages. Culture is supplied to the subsequent stages from the first stage on a continuous basis but the culture in the first stage is periodically replaced by fresh culture to avoid degeneration of the strain-specific characteristics of the microorganism in the first stage. The first and second stages of the process of the invention can each be carried out in one or more fermentors as will be hereinafter described. For the sake of convenience the vessel or vessels in which the first stage is carried out are referred to hereafter as the growth fermentor or fermentors. The vessel or vessels in which the second stage is carried out are referred to hereafter as the production fermentor or fermentors.

The method of periodically replacing the culture in the first stage can be carried out in several ways. For example, in carrying out the process of the invention a population of microorganisms in the productive stage of growth, i.e, in the second stage of the process, is maintained in a production fermentor. To this population is added at a steady rate, from one of a plurality of growth fermentors, a supply of the same microorganisms which have almost reached the end of the cell growth phase and are about to start the useful productive growth stage. The microorganisms in this stage of growth are referred to throughout this specification as "an actively growing population." Addition of fresh nutrient medium is made to the growth fermentor to maintain the culture therein in a steady state. It will be appreciated that the state of growth in any one of the growth fermentors is constantly changing and the supply from any one growth fermentor can only be used for a limited time before the strain-specific characteristics of the population of microorganisms show degeneration. Before the population of microorganisms in the growth fermentor being used for addition to the production fermentor shows such degeneration of its strain-specific characteristics the supply from this growth fermentor to the production fermentor is discontinued and is replaced by an actively growing population having the desired characteristics from another growth fermentor.

At the same time as addition of the actively growing population is made to the production fermentor, withdrawal of liquor from the latter is made at the same rate.

Figure 6:
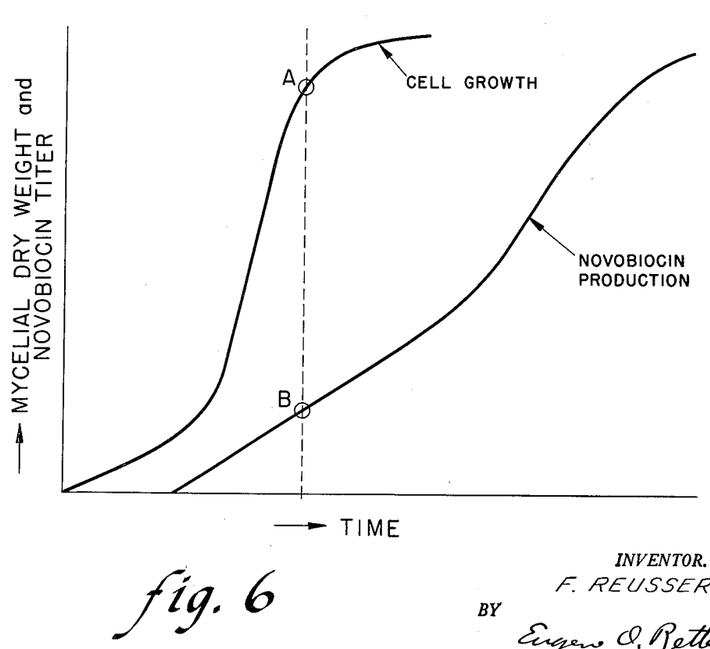

In carrying out the process of the invention the holdup time in the growth fermentor is preferably adjusted in such a manner that cell growth is confined largely to this vessel. Product formation will then take place in the subsequent production fermentor. The "holdup time" for a given fermentor in a continuous fermentation process is a function of the volume of the fermentor and the rate of addition of fresh liquor thereto and represents the time required to replace the whole of the liquor present in the fermentor at a given instant. The holdup time necessary in the growth fermentor to ensure that the cell growth phase takes place largely in said growth fermentor can be determined for any particular microorganism by a study of the growth characteristics of the latter. For example, a typical cell growth curve for the novobiocin-producing organism *Streptomyces niveus* is shown in FIGURE 6. The curve showing the production of novobiocin is also given. It will be seen that at the point A on the growth curve the cell growth phase of the organism is almost finished and the novobiocin-producing phase of the organism has begun (point B on the novobiocin production curve). In carrying out the process of the invention using this organism it is desirable to maintain the first stage of the process in a steady state of growth represented by the approximate point A on the cell growth curve in FIGURE 6. The holdup time necessary to maintain this or any particular state of growth as a steady state can be determined graphically from the growth curve by the method of Luedeking and Piret, Journal of Biochemical and Microbiological Technology and Engineering, 1, 431, 1959.

While the method of determining holdup time in the first stage has been illustrated with particular reference to the organism *Streptomyces niveus* it is to be understood that the same principles are applied to the determination of this factor in relation to the propagation of the many other microorganisms to which the process of the invention can be applied.

Since the rate of transfer of culture medium from the first to the second stage is controlled by the conditions of growth in the first stage, the only way of varying the holdup time in the second stage is by adjusting the volume of the fermentor or fermentors employed in this stage. In general the volume of culture liquor in the second stage is so adjusted that the holdup time in this stage is at least equal to the time required for the maximum production of the desired elaboration products to develop after transfer from the first stage.

The process of the present invention can be applied to the propagation, on a continuous basis, of any microorganisms which are normally subject to strain degeneration. The process of the invention is particularly adapted to the propagation of microorganisms of the genus Streptomyces of which the following are examples:

*Streptomyces albus* which produces the antibiotic actinomycetin;
*Streptomyces antibioticus* which produces actinomycin;
*Streptomyces erythreus* which produces erythromycin;
*Streptomyces griseus* which produces streptomycin and actidione;
*Streptomyces aureofaciens* which produces tetracycline and chlorotetracycline;
*Streptomyces niveus* which produces novobiocin;
*Streptomyces fradiae* which produces the neomycins;
*Streptomyces venezuelae* which produces chloroamphenicol.

The process of the invention can also be applied in the continuous propagation of other microorganisms normally subject to strain degeneration of which the following are typical:

(a) Fungi of the genus Penicillin such as *Penicillium notatum, Penicillium chrysogenum*, and the like which produce the penicillin group of antibiotics.

(b) Fungi of the genus Aspergillus, such as *Aspergillus niger*, which are used in the fermentative production of citric acid.

The process of the invention is carried out in a variety of ways, typical examples of which will now be discussed with reference to the accompanying drawings.

Figure 1:
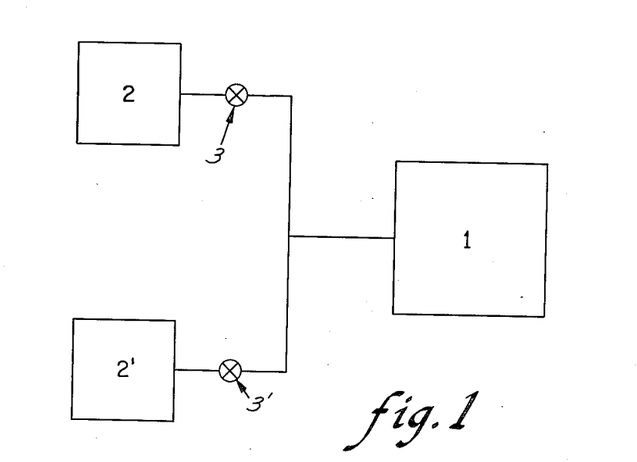
FIGURE 1 shows in schematic form apparatus in which the process of the invention can be carried out.

In FIGURE 1 there is shown in schematic form apparatus in which the process of the present invention can be carried out. The production fermentor 1 is coupled to the growth fermentors 2 and 2'. The flow of material from each of the growth fermentors 2 and 2' to the production fermentor 1 is controlled by valves 3 and 3', respectively. The production fermentor 1 and the growth fermentors 2 and 2' are also provided with means for aeration, means for agitation, means for temperature control, and means for the withdrawal and addition of liquid, none of which means is shown in FIGURE 1.

In carrying out the process of the invention, nutrient medium is placed in one of the growth fermentors and in the production fermentor and the growth fermentor is inoculated with a culture of the microorganism to be propagated. Continuous feed of sterile medium into the growth fermentor is started. The fermentation liquor in both fermentors is agitated and aerated.

Figures 2, 3:
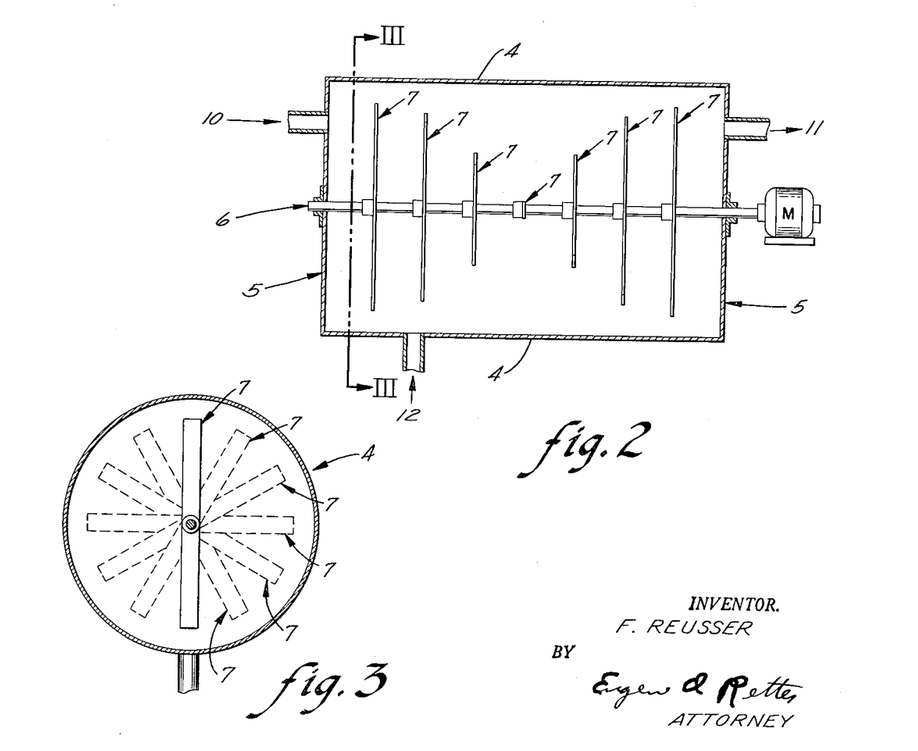
FIGURE 2 show a cross-sectional view of a particular embodiment of a production fermentor employed in the process of the invention.
FIGURE 3 shows a cross-sectional view along the line II—II of the fermentor shown in cross-section in FIGURE 2.

At the same time as medium addition to the growth fermentor is commenced, culture flows over by gravity into the production fermentor. The rate of addition of duces a high degree of agitation at very localized points in the fermentation liquor and at such points the oxygen uptake by the liquor is greatly facilitated. However, in the bulk of the fermentation the agitation is of a lower order insufficient to produce efficient oxygen uptake. In contrast the method of agitation in the elongated cylindrical fermentor described above produces a high degree of agitation through substantially the whole of the fermentation liquor. Each of the multiplicity of blades imparts a shearing force to the liquid through which it is passing. Further, each blade is constantly leaving and re-entering the surface of the fermentation liquor (this is in sharp contrast to conventional stirrers which are completely submerged in the liquid). Hence the surface of the liquor is constantly shattered by the re-entry of a blade. The shearing action of the blade in the liquid plus the constant shattering of the liquid surface greatly facilitates the uptake of oxygen by the liquid by breaking down both the liquid and the air into fine particles. Hence the operation of the rotating blades provides a high degree of agitation and a high rate of oxygen transfer at a multiplicity of points throughout the fermentation liquor in contrast to the localized agitation produced by conventional stirrers.

Figure 4:
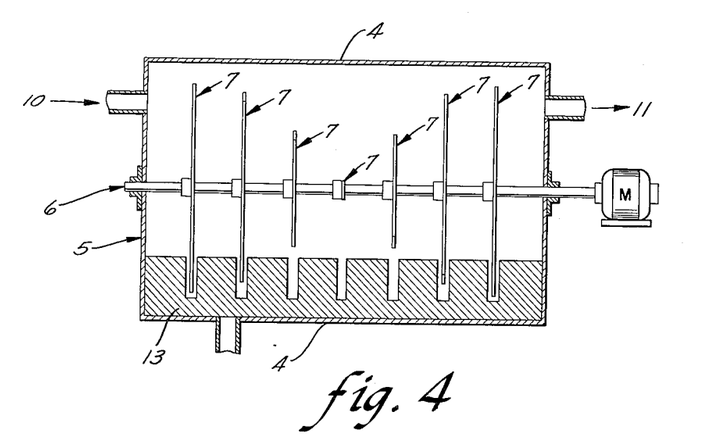
FIGURE 4 shows a method of mounting a baffle plate in the fermentor shown in cross-section in FIGURE 2.

In a modification of the type of cylindrical fermentor shown in FIGURE 2, the agitation and aeration of the fermentation liquid are improved still further by mounting one or more comb-shaped baffle plates longitudinally on the inner wall of the cylinder 4 so that said baffles are below the surface of the fermentation liquor. The baffle or baffles preferably take the form of strips of non-corrosive material such as stainless steel which project from the side of the vessel towards the central axis. The width of each strip is greater than the clearance between the tip of the blades 7 and the side of the cylinder 4, and is preferably of the order of slightly less than one-half the radius of the cylinder 4. Each strip is provided with slots through which the rotating blades 7 can pass, the clearance between the surface of the blades and the sides of the slots being as small as possible so that the passage of the blades through the slots imparts a shearing action to the fermentation liquor. The shape and manner of mounting these baffles is illustrated by FIGURE 4 which shows a typical baffle 13 in place in a cylindrical fermentor of the type shown in FIGURE 2.

Figure 5:
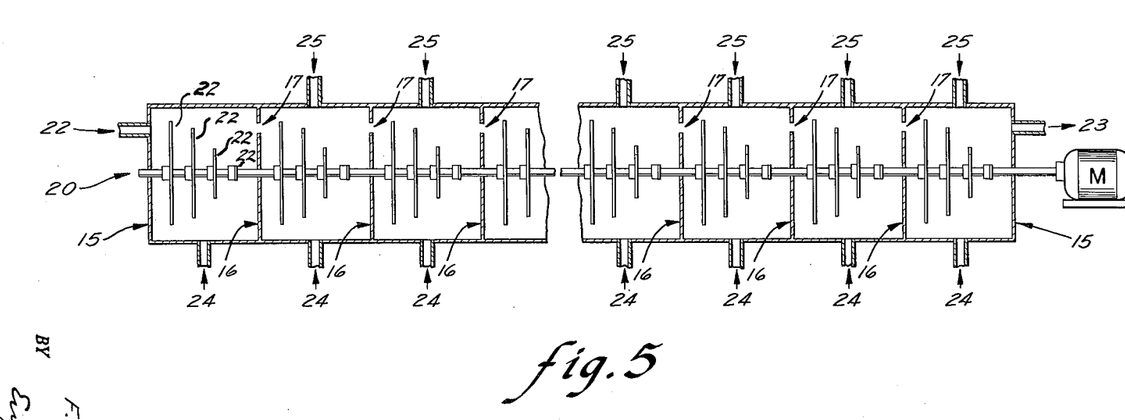
FIGURE 5 shows a cross-sectional view of another embodiment of a production fermentor to be employed in the process of the invention.

A further modification of the cylindrical fermentor is shown in FIGURE 5. The fermentor illustrated in FIGURE 5 is essentially a number of fermentors of the type illustrated in FIGURE 2 arranged in series, the contents of one member of the series being separated from that of its neighbours by means of plates having overflow holes in the upper part of their walls. Thus in FIGURE 5 the fermentor comprises a cylinder 14 mounted substantially horizontally and provided with end plates 15. The cylinder is divided into a plurality of compartments by means of plates 16 mounted in a plane at right angles to the longitudinal axis of the cylinder. Each of the plates 16 has a hole 17 in its upper surface which serves as overflow for fermentation liquor and air to the neighboring compartments. Each of the plates 16 and the end plates 15 is adapted to support an axle 20 on which are mounted blades 21 in the same manner as in the apparatus of FIGURE 2. The axle 20 can be rotated by means of a motor M mounted at one end thereof. One of the end plates 15 is provided with an inlet 22 for the introduction of actively growing microorganisms from the growth fermentor and the other end plate 15 is provided with an outlet 23 for removal of fermentation liquor. Each of the compartments in the cylinder is provided with inlet means 24 for the introduction of sterile air and the inlets 22 and 24 and the outlet 23 are provided with valves, metering devices, etc. (not shown). The cylinder 14 can also be provided with one or more horizontal baffles of the type 13 as shown in FIGURE 4.

The fermentor of the type shown in FIGURE 5 possesses the same advantages over conventional tank type fermentors, particularly in regard to the propagation of filamentous-growth type organisms, as does the fermentor of the type shown in FIGURE 2. The fermentor of the type shown in FIGURE 5 possesses additional advantages. Thus, within each compartment of this type of fermentor the fermentation liquor and the conditions of growth are substantially homogenous but there is heterogeneity of conditions between the various compartments. Further each of the compartments other than the first and last, is constantly receiving from its previous neighbors a supply of microorganisms which are in an earlier stage of growth and is constantly passing to its subsequent neighbor a supply of microorganisms in an earlier stage of growth than that in said neighbor. In other words when using a fermentor of the type shown in FIGURE 5 as production fermentor, the process of the invention is not only carried out by the passage of an actively growing population of microorganisms from one of the growth tanks to the first compartment of the production fermentor but is also repeated within each of the subsequent compartments of the production fermentor. The rate of addition of freshly growing microorganisms from the growth fermentor to the first compartment of the fermentor is so adjusted that the fermentation conditions in later compartments of the tube fermentor are maintained in a steady state at or approaching the optimum conditions of production for the particular operation which is being carried out. Thus in the propagation of an antibiotic-producing organism the rate of addition to the production fermentor would be so adjusted that the production of antibiotic is maintained in a substantially steady state in any one compartment but there is a gradient in titre of antibiotic between the compartments of the fermentor, the maximum occurring and being maintained in the later compartments.

Whilst the process of the invention is illustrated in the following examples by its application to the propagation of microorganisms which produce antibiotics it is to be understood that the process is not limited to such applications and can be used in the propagation of a wide variety of microorganisms subject to culture degeneration such as those set forth above.

Where the process of the invention is employed in the propagation of antibiotic-producing microorganisms the effluent from the fermentor can be processed on a continuous or semicontinuous basis, using conventional procedures such as filtration, solvent extraction, adsorption, and the like, to recover the antibiotic.

The following examples are illustrative of the process of the present invention but are not to be construed as limiting.

EXAMPLE 1

A fermentation in which novobiocin was produced by continuous propagation of *Streptomyces niveus* NRRL 2466 was carried out using the following procedure:

Three 10 liter fermentation tanks, each fitted with propeller-type stirrers, baffles, spargers for the introduction of sterile air, and cooling jackets, were employed. One of the tanks was operated as the production fermentor and was connected by pipes to each of the other tanks, which were operated as growth fermentors. The connecting pipes were provided with valves so that fermentation liquor could be supplied to the production fermentor from one or other of the growth fermentors independently. Each of the growth fermentors was connected by pipes to a fourth tank containing sterile nutrient medium having the following composition:

Glucose monohydrate ---------------------- g-- 40
Distiller's solubles ---------------------- g-- 40
Water to make ---------------------- ml-- 1000 pH adjusted to 8.4 by the addition of aqueous sodium hydroxide solution.

medium is maintained at the same level as the rate of withdrawal of fermentation liquor from the production fermentor, thus keeping the reaction volume of the whole system constant.

The rate of addition of medium to the growth fermentor, or in other words the holdup time in the growth fermentor, is chosen using the method hereinbefore described so that the cell growth stage of the microorganism is largely confined to the growth fermentor. After an interval of time shorter than that required for degeneration of the culture in the growth fermentor to occur, flow of culture to the production fermentor is replaced by a fresh culture prestarted in the other growth fermentor and having the same strain-specific characteristics as the original. This replacement of culture at similar intervals of time is continued throughout the life of the fermentation process. The interval of time for which the culture can be propagated continuously in the growth fermentor without degeneration taking place varies according to the microorganism which is being propagated and can be determined experimentally by continuous propagation of said microorganisms in the conventional manner without periodical replacement of the culture supplied to the growth fermentor. Generally speaking the culture in the growth fermentor has to be replaced after a time interval of between 7 and 30 days depending on the microorganism which is being propagated.

When using the above procedure the productive phase of the fermentation, i.e., the antibiotic production stage, occurs in the production fermentor and a steady titer of antibiotic in the effluent liquor from the production fermentor can be maintained over an indefinite period of time.

It will be seen that in the above process a minimum of two growth fermentors coupled to the production fermentor is required. After flow from one of the growth fermentors is discontinued the latter is emptied and cleaned, and preparation is made for the propagation of a fresh population of microorganisms so that the tank can be brought into use again when the the other growth fermentor requires replacing. Where more than one production fermentor is to be operated it may not be necessary to have two growth fermentors assigned to each production fermentor. For example, where two production fermentors are being operated simultaneously only three growth fermentors need be used, each of two of the growth fermentors being assigned to a different production fermentor and the third growth fermentor being used alternately for one or the other production fermentor.

In general the growth fermentors 2 and 2' take the form of conventional tanks in which batch-type fermentations are carried out. The production fermentor 1, in contrast, can take several different forms. Thus the production fermentor 1 can be a tank such as those normally employed in batch-type fermentations. This tank can be fitted with conventional type stirrers and the means of aeration and the method of operating the fermentor will be in accordance with usual practice. It is to be noted that although the fermentor 1 has been shown in FIGURE 1 as a single tank said fermentor may take the form of two or more fermentors coupled in series, the process of the invention being carried out in each of said fermentors simultaneously.

However, in a particular modification of the invention the production fermentor 1 takes the form of an elongated cylinder mounted with its longitudinal axis substantially in a horizontal plane. A suitable form of such a fermentor is shown in FIGURE 2 wherein the cylinder 4 has a circular cross-section and is mounted with its longitudinal axis substantially in a horizontal plane. The axial length of the cylinder 4 is greater than the diameter thereof. The cylinder 4 is provided with end plates 5, each of said end plates being adapted to support an axle 6 which is disposed along the central axis of the cylinder 4.

At intervals along the axle 6 and at right angles thereto there is mounted a plurality of blades 7, each blade being offset radially with respect to its neighbours as shown in FIGURE 3. Said blades are preferably constructed of stainless steel having a thickness of from about 2 mm. to about 10 mm.

It is to be understood that the number of blades 7 can be increased or decreased as desired and is in no way limited to the seven drawn for purposes of illustration in FIGURE 2. The axle 6 is coupled at one end to a motor M. The cylinder 4 is provided with an inlet 10 for the introduction of culture medium in the upper half of one of the end plates 5, an outlet 11 for withdrawal of fermentation liquor in the upper half of the other of the end plates 5, and one or more inlets 12, for sterile air, disposed along the lower wall of the cylinder 4, each of the inlets or outlets 10, 11, and 12, being provided with valves, metering devices, etc. (not shown). The air which is to be introduced through the inlets 12 is sterilized using conventional procedures such as steam treatment and passage through filters, etc.

In using a cylindrical fermentor, such as that shown in FIGURE 2, as the production fermentor 1 in the process of the invention, the volume of fermentation liquor in the cylinder can be varied within wide limits. However, it is preferred to employ a volume of fermentation liquor of the order of three-quarters of the total volume of the cylinder 4. The fermentation liquor in the cylindrical fermentor is agitated by rotation of the axle 6, and aerated by the introduction of air through the inlet 12.

The use of a cylindrical fermentor, such as that shown in FIGURE 2 or modifications thereof to be described hereinafter, as the production fermentor in the process of the invention, is particularly advantageous when the microorganism which is being propagated is of the filamentous-growth type variety. As previously mentioned such organisms are characterized by the growth of long, interwoven threads which type of growth makes the resulting fermentation liquor difficult to agitate and aerate. The mechanical difficulties involved in agitation of fermentation liquors resulting from the above type of organism can lead to conditions which are conducive to a change in the strain-specific characteristics of the microbial population. For example, when a fermentation liquor having a heavy mycelial growth, such as is generally found in the propagation of filamentous microorganisms, is subjected to agitation, for example, using a paddle stirrer, in a conventional fermentation tank, mycelium is constantly being deposited on the exposed surfaces of the fermentation tank in the free space above the liquor. The formation of such deposits, as well as causing serious blockages of feed lines, etc., means that the conditions of fermentation are not uniform and the growth characteristics of the microorganism within the deposit are different from those within the bulk of the fermentation liquor. In particular there is a tendency for sporulation to occur when deposition takes place and this may lead to loss of useful biosynthetic activity within the fermentation vessel.

We have now found that the mechanical difficulties hitherto encountered in the agitation and aeration of fermentation liquors in which filamentous microorganisms are being propagated can be overcome by the use of an elongated cylindrical fermentor such as that shown in FIGURE 2. The cutting action of the stainless steel blades 7 supplements the normal stirring provided by rotation of these blades and enables adequate agitation and aeration to be provided in the fermentor without deposition of mycelium on the walls or in the free spaces of the fermentor.

The type of agitation provided by the rotation of the blades 7 in the above-described fermentor is novel and is distinguished from that which is normally employed in conventional fermentors. Thus in a conventional tank fermentor the agitation is provided by the rotation of a paddle type stirrer. The operation of such a stirrer pro- The run was initiated by pumping 10 liters of sterile nutrient medium having the above composition into one of the growth fermentors and inoculating the medium with vegetative inoculum, prepared by growing a single spore, taken from a stock culture of *Streptomyces niveus*, in an agar plug, transferring the mycelium to a shake flask, and using the resulting vegetative growth to inoculate agar slants from which shake flasks and then seed tanks were propagated. The inoculated liquor was maintained at 30° C., stirred using a stirrer speed of 450 r.p.m., and aerated at a rate of 4 l. per min. of sterile air. Three days after inoculation, addition was commenced of sterile nutrient medium from the feed tank at the rate of 0.5 liter per hour. Fermentation liquor from the growth fermentor passed under gravity to the production fermentor where the fermentation was maintained under the same conditions of aeration, stirring, and temperature. When the volume in the production fermentor had reached 10 liters, liquor was withdrawn from the production fermentor at the same rate as liquor flowed from the growth fermentor to the production fermentor. After the addition of liquor from the growth to the production fermentor had been in progress for 7 days the flow was discontinued and replaced by flow from the other growth fermentor in which a fermentation had been started 3 days previously in the same manner as that described above for the other growth fermentor. At the same time the continuous flow of nutrient medium was switched from the old to the new growth fermentor and maintained at the same rate as previously. When flow from the new growth fermentor had been used for a further 7 days it was discontinued and replaced by flow from the other growth fermentor in which a new fermentation had been started three days previously. This process of switching of growth fermentors was maintained throughout the fermentation.

The concentration of novobiocin in the effluent from the production fermentor reached a level of 300 mcg./ml. four days after the production fermentor was put into operation and maintained this level for a total of 34 days without evidence of rundown. At the end of 34 days the run was discontinued.

EXAMPLE 2

A fermentation in which streptozotocin was produced by the continuous propagation of *Streptomyces achromogenes* var. 128 NRRL 2697 was carried out using the following procedure.

The procedure employed was exactly as described in Example 1 with the exception that the organism was *Streptomyces achromogenes* var. 128 and the nutrient medium had the following composition:

| | |
|---|---|
| Glucose monohydrate ______________________g__ | 40 |
| Peptone (Wilson's) ______________________g__ | 20 |
| Sodium chloride ______________________g__ | 2.5 |
| Zinc sulfate ______________________g__ | 0.001 |
| Tap water to make ______________________liters__ | 1 | pH adjusted to 6 by the addition of aqueous sodium hydroxide solution before sterilization.

The feed rate for addition of sterile medium into the growth fermentor was 0.5 liter per hour.

The concentration of streptozotocin in the effluent from the production fermentor maintained a level between 100 and 200 mcg./ml. for 45 days (at which time the fermentation was discontinued) without evidence of strain degeneration.

EXAMPLE 3

A fermentation in which novobiocin was produced by continuous propagation of *Streptomyces niveus* NRRL 2466 was carried out using the following procedure:

The production fermentor consisted of a horizontal stainless steel cylinder 18 feet in length and 8 inches in diameter comprised of 9 flanged compartments, each 2 feet long. The fermentor was sealed at each end by end plates and between each flange was mounted a stainless steel plate having a replaceable bearing at its center and a circular hole 1 inch in diameter located 1 inch from its uppermost edge. Two independently driven shafts, each 9 feet in length, were mounted end to end along the longitudinal axis of the cylinder. The shafts were supported by bearings in each of the flange plates and were provided with sterilizable mechanical seals at the point at which they emerged from the end plates. A total of 30 blades of 26 gauge stainless steel, each blade being 3.5 inches in length, were mounted at regular intervals along the shafts. Each section was provided with a stainless steel comb-shaped baffle plate ⅜" in thickness and 3 inches high mounted along the length of the section at its lowest point. The plates were provided with serrations through which the agitator blades could pass when rotated. Each section of the fermentor was provided with a sight glass, a light glass, two cooling jackets supplied with cooling water controlled by manually operated valves, air inlets (fitted with rotameters) on the bottom of each section, and inlets for antifoam. One end plate of the fermentor was provided in its upper surface with an inlet valve through which fermentation liquor from one or other of the growth fermentors could be supplied. The other end plate was provided with an outlet valve through which fermentation liquor could be removed and passed to a collection vessel. The total capacity of the described fermentor was approximately 180 liters and the capacity of each individual section was approximately 20 liters.

To the inlet end of the above fermentor were connected two 20 liter tank fermentors serving as growth fermentors, each of which was provided with propeller type stirrers, baffles, sparges for the introduction of sterile air and cooling jackets. The connecting pipes were provided with valves so that fermentation could be supplied to the production fermentor from either growth fermentor independently. Each of the growth fermentors was connected to a reservoir tank containing sterile nutrient medium having the following composition:

| | |
|---|---|
| Glucose monohydrate ______________________g__ | 40 |
| Distiller's solubles ______________________g__ | 40 |
| Water to make ______________________ml__ | 1000 | pH adjusted to 8.4 by the addition of aqueous sodium hydroxide solution.

The run was initiated by pumping 20 liters of sterile nutrient medium having the above composition into one of the growth fermentors and inoculating the medium with vegetative inoculum, prepared by growing a single spore, taken from a stock culture of *Streptomyces niveus*, in an agar plug, transferring the mycelium to a shake flask, and using the resulting vegetative growth to inoculate agar slants from which shake flasks and then seed tanks were propagated. The inoculated liquor was maintained at 30° C., stirred using a stirrer speed of 400 r.p.m., and aerated at a rate of 15 l. per min. of sterile air. Three days after inoculation, addition was commenced of sterile nutrient medium from the reservoir at the rate of 0.96 liter per hour. The addition was made under pressure thereby forcing fermentation liquor to flow from the growth fermentor at the same rate as the nutrient medium was added. The fermentation liquor so removed from the growth fermentor was passed under gravity to the production fermentor in which the shaft bearing the stainless steel blades was rotating at 600 r.p.m. and sterile air was introduced at the rate of 10 l. per min. per section. After addition of liquor from the growth fermentor to the production fermentor had been in progress for 7 days the flow was discontinued and replaced by flow from the other growth fermentor in which a fermentation had been started 3 days previously in the same manner as that described above for the other growth fermentor. At the same time the flow of nutrient medium was switched from the old to the new growth fermentor and maintained at the same rate as previously. After a further 7 days the flow from the growth fermentor was again discontinued and replaced by flow from the other growth fermentor and this process was repeated every 7 days throughout the life of the fermentation. Samples were taken daily from the growth fermentor and from each compartment of the production fermentor and examined for sterility, pH, wet solid matter, total carbohydrate and for novobiocin. The effluent liquor in the outlet of the system had a steady state concentration of novobiocin of approximately 500 mcg./ml. and this level was maintained for 33 days without any evidence of culture degeneration. The fermentation was discontinued after 33 days.

I claim:

1. In a fermentation process utilizing a strain-specific characteristic of microorganisms, the method of preventing degeneration of the strain-specific characteristics of said microorganisms which comprises culturing said microorganisms in a plurality of stages, the cell-growth phase of the microorganisms being confined substantially to the first stage and the productive growth phase of the microorganisms taking place substantially in the later stages, continuously adding nutrient medium to the first stage and continuously withdrawing culture medium therefrom into the next stage at a rate to maintain the propagation of said microorganisms in a steady state, and periodically replacing the culture in the first stage with a fresh culture of said microorganism, the replacement taking place before the strain-specific characteristics of the culture in use in the first stage have shown degeneration.

2. A process for maintaining indefinitely the strain-specific characteristics of a population of microorganisms capable of producing elaboration products which population is normally subject to degeneration of said characteristics, which comprises propagating said microorganisms under aerobic conditions in a production fermentor, adding continuously to the brew in said production fermentor from one of a succession of growth fermentors an actively growing population of the same microorganism having the desired strain-specific characteristics, allowing brew to flow continuously from said production fermentor at substantially the same rate as the fresh population is introduced, so that the total volume of brew in said production fermentor remains substantially constant, and, before the strain-specific characteristics of the population of microorganisms flowing from the growth fermentor to said production fermentor show degeneration, cutting off the flow from said growth fermentor and replacing by flow of an actively growing population having the desired strain-specific characteristics from another growth fermentor, the rate of addition of the actively growing population being controlled throughout so that the strain-specific characteristics of the microbial population in the production fermentor are maintained substantially in a steady state.

3. A process for maintaining indefinitely the strain-specific characteristics of a population of microorganisms capable of producing elaboration products which population is normally subject to degeneration of said characteristics, which comprises propagating said microorganisms under aerobic conditions in an elongated cylindrical production zone mounted with its longitudinal axis substantially in a horizontal plane, the contents of said production zone being agitated by the rotation of a plurality of blades mounted at right angles to the longitudinal axis of the production zone, adding continuously to the brew in one end of the production zone from one of a succession of growth fermentors an actively growing population of the same microorganisms having the desired strain-specific characteristics, and allowing brew to flow continuously from the opposite end of said production zone so that the total volume of brew in said production zone remains constant, and, before the strain-specific characteristics of the population of microorganisms flowing from the growth fermentor to said production zone show degeneration, discontinuing the flow from said growth fermentor and replacing by flow of an actively growing population having the desired strain-specific characteristics from another growth fermentor, the rate of addition of the actively growing population being controlled so that the strain-specific characteristics of the microbial population in the production zone are maintained in a substantially steady state.

4. A process of maintaining indefinitely the strain-specific characteristics of a population of microorganisms capable of producing elaboration products, which population is normally subject to degeneration of said characteristics, which comprises propagating said microorganisms under aerobic conditions in an elongated cylindrical production zone mounted with its longitudinal axis substantially in a horizontal plane, the contents of said production zone being agitated by the rotation of a plurality of blades mounted at right angles to the longitudinal axis of the production zone, said blades passing through corresponding slots in at least one baffle plate mounted lengthwise on the inner surface of the lower part of said production zone, said baffle plate projecting inwardly from the wall of said production zone a distance greater than the clearance between the tips of said blades and the walls of said production zone, adding continuously to the brew in one end of the production zone from one of a succession of growth fermentors an actively growing population of the same microorganism having the desired strain-specific characteristics, and allowing brew to flow continuously from the opposite end of said production zone so that the total volume of brew in said production zone remains constant, and, before the strain-specific characteristics of the population of microorganisms flowing from the growth fermentor to said production zone show degeneration, discontinuing the flow from said growth fermentor and replacing by flow of an actively growing population having the desired strain-specific characteristics from another growth fermentor, the rate of addition of the actively growing population being controlled so that the strain-specific characteristics of the microbial population in the production zone are maintained in a substantially steady state.

5. A process for maintaining indefinitely the strain-specific characteristics of a population of microorganisms capable of producing elaboration products, which population is normally subject to degeneration of said characteristics, which comprises propagating said microorganisms under aerobic conditions in an elongated cylindical production zone mounted with its longitudinal axis substantially in a horizontal plane, said production zone being divided into a plurality of interconnecting compartments, the contents of each of said compartments being agitated by the rotation of a plurality of blades mounted at right angles to the longitudinal axis of the production zone, said blades passing through corresponding slots in baffle plates mounted lengthwise on the inner surface of the lower part of the compartments of said production zone, said baffle plates projecting inwardly from the wall of said production zone a distance greater than the clearance between the tips of said blades and the walls of said production zone, adding continuously to the brew in one end of the production zone from one of a succession of growth fermentors an actively growing population of the same microorganism having the desired strain-specific characteristics, and allowing brew to flow continuously from the opposite end of said production zone so that the total volume of brew in said production zone remains constant, and, before the strain-specific characteristics of the population of microorganisms flowing from the growth fermentor to said production zone show degeneration, cutting off the flow from said growth fermentor and replacing by flow of an actively growing population having the desired strain-specific characteristics from another growth fermentor, the rate of addition of the actively growing population being controlled so that the strain-specific characteristics of the microbial population in the compartments of the production zone are maintained in a substantially steady state.

6. A process for the continuous production of an antibiotic which comprises propagating an antibiotic-producing microorganism under aerobic conditions in an elongated cylindrical production zone mounted with its longitudinal axis substantially in a horizontal plane, the contents of said production zone being agitated by the rotation of a plurality of blades mounted at right angles to the longitudinal axis of the production zone, adding continuously to the brew in one end of the production zone from one of a succession of auxiliary fermentors an actively growing poulation of the same microorganisms having the desired strain-specific characteristics, and allowing brew to flow continuously from the opposite end of said production zone so that the total volume of brew in said production zone remains constant, and, before the strain-specific characteristics of the population of microorganisms flowing from the growth fermentor to said production zone show degeneration, cutting off the flow from said growth fermentor and replacing by flow of an actively growing population having the desired strain-specific characteristics from another growth fermentor, the rate of addition of the actively growing population being controlled so that the strain-specific characteristics of the microbial population in the production zone are maintained in a substantially steady state in the antibiotic-producing growth stage, and recovering the antibiotic activity from the withdrawn fermentation liquor.

7. A process for the continuous production of an antibiotic which comprises propagating an antibiotic-producing microorganism under aerobic conditions in an elongated cylindrical production zone mounted with its longitudinal axis substantially in a horizontal plane, said production zone being divided into a plurality of interconnecting compartments, the contents of each of said compartments being agitated by the rotation of a plurality of blades mounted at right angles to the longitudinal axis of the production zone, said blades passing through corresponding slots in baffle plates mounted lengthwise on the inner surface of the lower part of the compartments of said production zone, said baffle plates projecting inwardly from the wall of said production zone a distance greater than the clearance between the tips of said blades and the walls of said production zone, adding continuously to the brew in one end of the production zone from one of a succession of auxiliary fermentors an actively growing population of the same microorganism having the desired strain-specific characteristics, and allowing brew to flow continuously from the opposite end of said production zone so that the total volume of brew in said production zone remains constant, and, before the strain-specific characteristics of the population of microorganisms flowing from the growth fermentor to said production zone show degeneration, cutting off the flow from said growth fermentor and replacing by flow of an actively growing population having the desired strain-specific characteristics from another growth fermentor, the rate of addition of the actively growing population being controlled so that the strain-specific characteristics of the microbial population in the compartments of the production zone are maintained in a substantially steady state in the antibiotic-producing stage of growth, and recovering the antibiotic activity from the withdrawn fermentation liquor.

8. A process for the continuous propagation of a microorganism of the genus Streptomyes which comprises propagating said microorganism under aerobic conditions in a production fermentor, adding continuously to the brew in said production fermentor from one of a series of growth fermentors an actively growing population of the same microorganism having the desired strain-specific characteristics, and allowing brew to flow continuously from said production fermentor so that the total volume of brew in said production fermentor remains constant, and, before the strain-specific characteristics of the population of microorganisms flowing from the growth fermentor to said fermentor show degeneration, cutting off the flow from said growth fermentor and replacing by flow of an actively growing population having the desired strain-specific characteristics from another growth fermentor, the rate of addition of the actively growing population being controlled so that the strain-specific characteristics of the microbial population in the growth fermentor are maintained in a substantially steady state in the antibiotic-producing stage of growth.

9. A process for the continuous propagation of a microorganism of the genus Streptomyes which comprises propagating said microorganism under aerobic conditions in an elongated cylindrical production zone mounted with its longitudinal axis substantially in a horizontal plane, the contents of said zone being agitated by the rotation of a plurality of blades mounted at right angles to the longitudinal axis of the production zone, adding continuously to the brew in one end of the production zone from one of a succession of growth fermentors an actively growing population of the same microorganisms having the desired strain-specific characteristics, allowing brew to flow continuously from the opposite end of said production zone so that the total volume of brew in said production zone remains substantially constant, and, before the strain-specific characteristics of the population of microorganisms flowing from the growth fermentor to said production fermentor show degeneration, cutting off the flow from said auxiliary fermentor and replacing by flow of an actively growing population having the desired strain-specific characteristics from another growth fermentor, the rate of addition of the actively growing population being controlled throughout so that the strain-specific characteristics of the microbial population in the production zone are maintained in a substantially steady state in the antibiotic-producing stage of growth.

10. A process for the continuous propagation of a microorganism of the genus Streptomyes which comprises propagating said microorganism under aerobic conditions in an elongated cylindrical production zone mounted with its longitudinal axis substantially in a horizontal plane, said production zone being divided into a plurality of interconnecting compartments, the contents of each of said compartments being agitated by the rotation of a pluraliy of blades mounted at right angles to the longitudinal axis of the production zone, said blades passing through corresponding slots in baffle plates mounted lengthwise on the inner surface of the lower part of the compartments of said production zone, said baffle plates projecting inwardly from the wall of said production zone a distance greater than the clearance between the tips of said blades and the walls of said production zone, adding continuously to the brew in one end of said production zone from one of a succession of growth fermentors an actively growing population of the same microorganism having the desired strain-specific characteristics, and allowing brew to flow continuously from the opposite end of said production zone so that the total volume of brew in said production zone remains constant, and, before the strain-specific characteristics of the population of microorganisms flowing from the growth fermentor to said production zone show degeneration, cutting off the flow from said growth fermentor and replacing by flow of an actively growing population having the desired strain-specific characteristics from another growth fermentor, the rate of addition of the actively growing population being controlled so that the strain-specific characteristics of the microbial population in the compartments of the production zone are maintained in a substantially steady state in the antibiotic-producing stage of growth.

References Cited in the file of this patent

UNITED STATES PATENTS 1,760,267 Harrison ______________ Mar. 11, 1930
1,818,530 Boye ____________________ Aug. 11, 1931
2,793,166 Hatch __________________ May 21, 1957

OTHER REFERENCES

Gershenfeld, "Bacteriology and Allied Subjects," Marks Publishing Company, Easton, Pa., 1945, pp. 83–84.